June 27, 1950     R. L. WESTALL     2,512,757
LIQUID LEVEL INDICATOR FOR STORAGE BATTERIES
AND OTHER LIQUID CONTAINERS
Filed Sept. 13, 1947
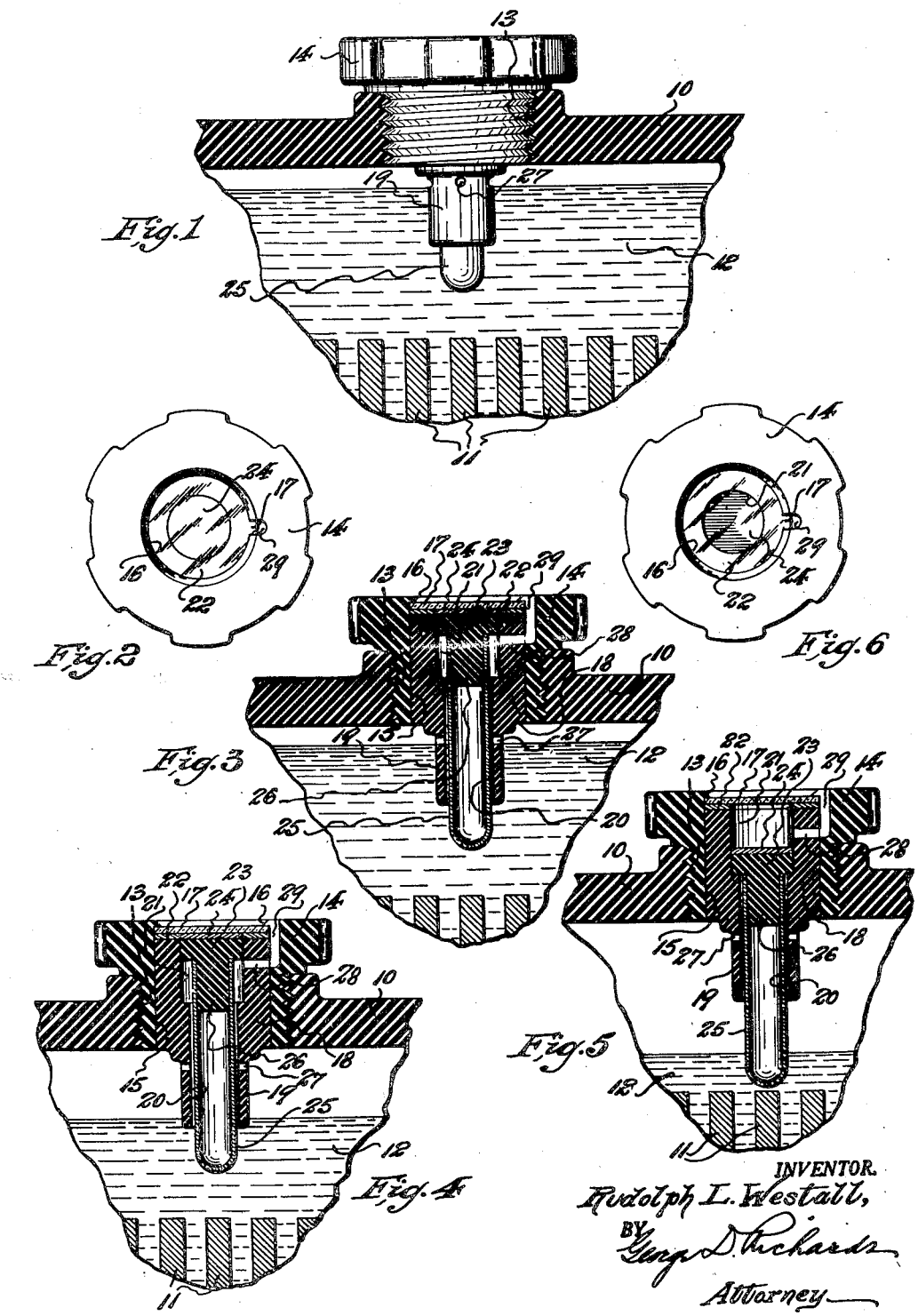
INVENTOR.
Rudolph L. Westall,
BY George D. Richards
Attorney Patented June 27, 1950

2,512,757

UNITED STATES PATENT OFFICE 2,512,757

LIQUID LEVEL INDICATOR FOR STORAGE BATTERIES AND OTHER LIQUID CONTAINERS

Rudolph L. Westall, Springfield, N. J.

Application September 13, 1947, Serial No. 773,770

2 Claims. (Cl. 136—182)

This invention relates generally to improvements in means for indicating the liquid level condition within a closed liquid container, and more particularly to indicating the liquid level conditions within the cells of storage batteries.

The invention has for an object to provide in combination with a closure plug by which a filling opening of a container or storage battery cell is normally closed, a visible means which is operative to indicate the liquid level condition within said container or cell, whereby to give timely warning as to necessity for replenishing the liquid content of said container or cell.

The invention has for another object to provide an indicating means for the stated purposes which includes a buoyant member adapted to be influenced by the liquid content of a container or cell; said buoyant member being so constructed and related to the closure plug and the container or cell interior as to be subject to an excess of buoying pressure by the liquid when said liquid stands at normal filling level within the container or cell, so that the indicating movement of said member is delayed until a lowering of the liquid level approaches a dangerous point, thus permitting a certain amount of liquid level drop to occur without premature operation of the indicating means, and consequently permitting said indicating means to function in more positive relation to the time when liquid replenishment becomes imperative.

Other objects of this invention, not at this time more particularly enumerated, will be understood from the following detailed description of the same.

An illustrative embodiment of the invention as applied to a storage battery is shown in the accompanying drawings, in which:

Fig. 1 is a fragmentary sectional view of a storage battery showing, in side elevation, the combined filling opening closure plug and indicating means as operatively applied thereto, and showing the water filling the battery to a normal level; Fig. 2 is a top end elevational view of the combined closure plug and indicating means, with the latter indicating water filled condition of the battery; Fig. 3 is a sectional view corresponding to that of Fig. 1, but showing the combined closure plug and indicating means in vertical cross section; Fig. 4 is a view similar to that of Fig. 3, but showing a drop of water level within the battery but not yet sufficient to change position of the indicating means; Fig. 5 is a view similar to that of Fig. 3, but showing the water level within the battery as lowered to a danger point at which the indicating means has moved to indicate need for water replenishment; and Fig. 6 is a top end elevational view with the indicating means in the indicating position of Fig. 5.

Similar characters of reference are employed in the above described views, to indicate corresponding parts.

Referring to the drawings, the reference character 10 indicates the top wall of a storage battery containing the usual battery plates 11 which are submerged in the water content 12 of said battery. Said top wall 10 of the battery is provided with the usual internally screw-threaded filling opening 13 which is normally closed by a removable closure plug 14 adapted to be screwed thereinto.

Said closure plug 14 is provided with an endwise open bore 15 extending axially therethrough, and provided at its upper end with an internal annular stop shoulder or bead 16, which overlies and holds against outward displacement a transparent stop panel 17 made of glass or other suitable transparent material. Fixed within the bore 15 of the closure plug 14, beneath said transparent stop panel 17, is the main body portion 18 of the liquid level indicating means; said main body portion 18 preferably terminating at its lower end in an extension 19 of reduced diameter which projects downwardly from the inner end of the closure plug 14, into the battery interior. Extending upwardly through said extension 19 and main body portion 18 is an axial passage 20 which terminates at its upper end in a diametrically enlarged recess 21 arranged to open out of the upper end of said main body portion 18. The upper end of said main body portion 18 is faced with a fixed or stationary indicator means 22 which comprises an annular body adapted to surround the margins of said recess 21, and to contiguously underlie the transparent stop panel 17. Said fixed or stationary indicator means 22 is of a light color, preferably of the color white.

Vertically movable within the recess 21 of said main body portion 18 is a movable indicator means 23 which slidably fits within said recess, the upper end of which is faced with an indicator element 24 of light or white color corresponding to that of the fixed or stationary indicator means 22. Said indicator means 23 is of substantially less height than the depth of the recess 21. Affixed to the lower end of said movable indicator means 23 so as to depend therefrom is a buoyant element of substantial length adapted to loosely extend downwardly through the passage 20 of said main body portion 18 and its extension 19, so as to project from the latter into the interior of the battery, and for a substantial depth of penetration into the water content of the latter, when said water stands at a normal filled level. Said buoyant element may be made of any material having substantially less specific gravity than that of the water contained in the battery, such e. g. as cork, wood, or a hermetically sealed hollow body. A preferred embodiment of said buoyant element, as shown, comprises a hollow air filled float body 25 having a closed free or bottom end, with its upper open end connected in coupled, closed and sealed relation to the movable indicator means 23, as by a coupling plug extension 26 with which the latter is provided, and which is entered in the upper end portion of the float body 25.

Means is provided in connection with the closure plug 14 and the indicating means contained therein for venting gases which generate within the battery interior. One illustrative form of such means, as shown, comprises one or more intake vent openings 27 extending through the walls of said extension 19 of the main body 18 for communication with the passage 20 and recess 21, and discharge vent passages 28 and 29 leading outwardly from said recess 21 through said main body portion 18 and through the closure plug 14 to the atmosphere.

The battery may be filled with its necessary water content 12 in the usual manner by removing the closure plug 14 and pouring the water into the battery interior through the filling opening 13, whereafter the closure plug 14 is again entered in said filling opening so as to close the same, which at the same time operatively relates the indicating means, which is carried by said closure plug, to the water content 12 of the battery.

When the water 12 in the battery fills the latter to a normal filled level, as shown in Figs. 1 and 3, the float body 25 of the indicating means will penetrate said water to such substantial depth as to be submerged well beyond the point of its balanced buoyancy if free. Owing to this the float body 25 is subjected to an excess of buoying pressure, and the movable indicator means 23 supported thereby will be strongly upthrust through the recess 21 and into stopped engagement with the transparent stop panel 17, thus disposing its indicator element 24 within the opening of the stationary indicator element 22 and level or flush with the latter (see Figs. 2 and 3). Under these conditions, the aligned indicator elements 22 and 24 will appear to form a single light reflecting disc of uninterrupted surface, which appearance indicates that sufficient water is contained in the battery to effect assured operation thereof and preservation of its plates 11.

Owing to the depth of penetration of the float body 25 into the water content of the battery when the latter is full, and the consequent excess of buoyant pressure exerted by the water on the so disposed float body, it will be obvious that an initial lowering of water level by reason of losses by evaporation may occur without disturbing the position of the indicating means (see Fig. 4). The drop of water level may continue until the lowering water level approaches a point where continued losses by evaporation would so further lower the water level as to risk detrimental exposure of the battery plates 11. The length and proportions of the float body 25 are so predetermined that its buoyancy balance occurs when such point of lowered water level is reached, and consequently the float body will thereafter quickly descend so as to cause accompanying descent of the movable indicator means 23 within the recess 21. Such descent of the movable indicator means 23 downwardly withdraws its indicator element 24 into the recess 21 and below the stationary indicator element 22, so that the walls of the recess 21 shadow and thus darken said indicator element 24, whereby it appears to sharply contrast with the stationary indicator element in color (see Figs. 5 and 6). Such condition immediately gives visible indication that necessity for replenishing the water content of the battery has arisen.

Although I have above described my liquid level indicator as applied to a storage battery, it will be obvious that its employment is not limited to such use, since the same may be employed with any type of liquid containers in the use of which it is desirable to ascertain the level of liquid therein.

Having now described my invention, I claim:

1. In a storage battery container having a filling opening, a closure plug for said opening, said closure plug having an axial bore provided at its outer end with an internal shoulder, a flat transparent stop panel seated against said shoulder across the outer end of said bore, a stationary indicator member fixed within said bore in abutted engagement with said stop panel, the thus abutted upper end of said stationary indicator member having a light reflective facing, said stationary indicator member having an extension dependent within the interior of said storage battery container, said stationary indicator member and its extension having an axial passage extending upwardly therethrough and terminating at its upper end in a diametrically enlarged outwardly open recess, a movable indicator member within said recess adapted to be normally stopped against said stop panel flush with said stationary indicator member, the outer end of said movable indicator member having a light reflective facing cooperative with the light reflective facing of said stationary indicator member, and a buoyant float body by which said movable indicator member is supported, said float body slidably extending through the axial passage of said stationary indicator member so as to penetrate below the normal level of the liquid content of the storage battery container.

2. In a storage battery container having a filling opening, a closure plug for said opening, said closure plug having an axial bore provided at its outer end with an internal shoulder, a flat transparent stop panel seated against said shoulder across the outer end of said bore, a stationary indicator member fixed within said bore in abutted engagement with said stop panel, the thus abutted upper end of said stationary indicator member having a light reflective facing, said stationary indicator member having an extension dependent within the interior of said storage battery container, said stationary indicator member and its extension having an axial passage extending upwardly therethrough and terminating at its upper end in a diametrically enlarged outwardly open recess, a movable indicator member within said recess adapted to be normally stopped against said stop panel flush with said stationary indicator member, the outer end of said movable indicator member having a light reflective facing cooperative with the light reflective facing of said stationary indicator member, a buoyant float body by which said movable indicator member is supported, said float body slidably extending through the axial passage of said stationary indicator member so as to penetrate below the normal level of the liquid content of the storage battery container, the extension of said stationary indicator member having vent intake means communicating between the interior of the storage battery container and the axial passage and recess of said stationary indicator member, and said plug and stationary indicator member having vent outlet means leading from the recess of the latter to the atmosphere.

RUDOLPH L. WESTALL.

REFERENCES CITED

The following references are of record in the file of this patent:

UNITED STATES PATENTS

| Number    | Name       | Date           |
|-----------|------------|----------------|
| 631,191   | Westerdahl | Aug. 15, 1899  |
| 1,491,143 | Kerr       | Apr. 22, 1924  |
| 1,525,985 | Feldkamp   | Feb. 10, 1925  |
| 1,878,867 | Leukhardt  | Sept. 20, 1932 |
| 2,469,560 | Jutte      | May 10, 1949   |

OTHER REFERENCES

Scientific American, February 1934, vol. 150, No. 2, page 99.